Figure 1:
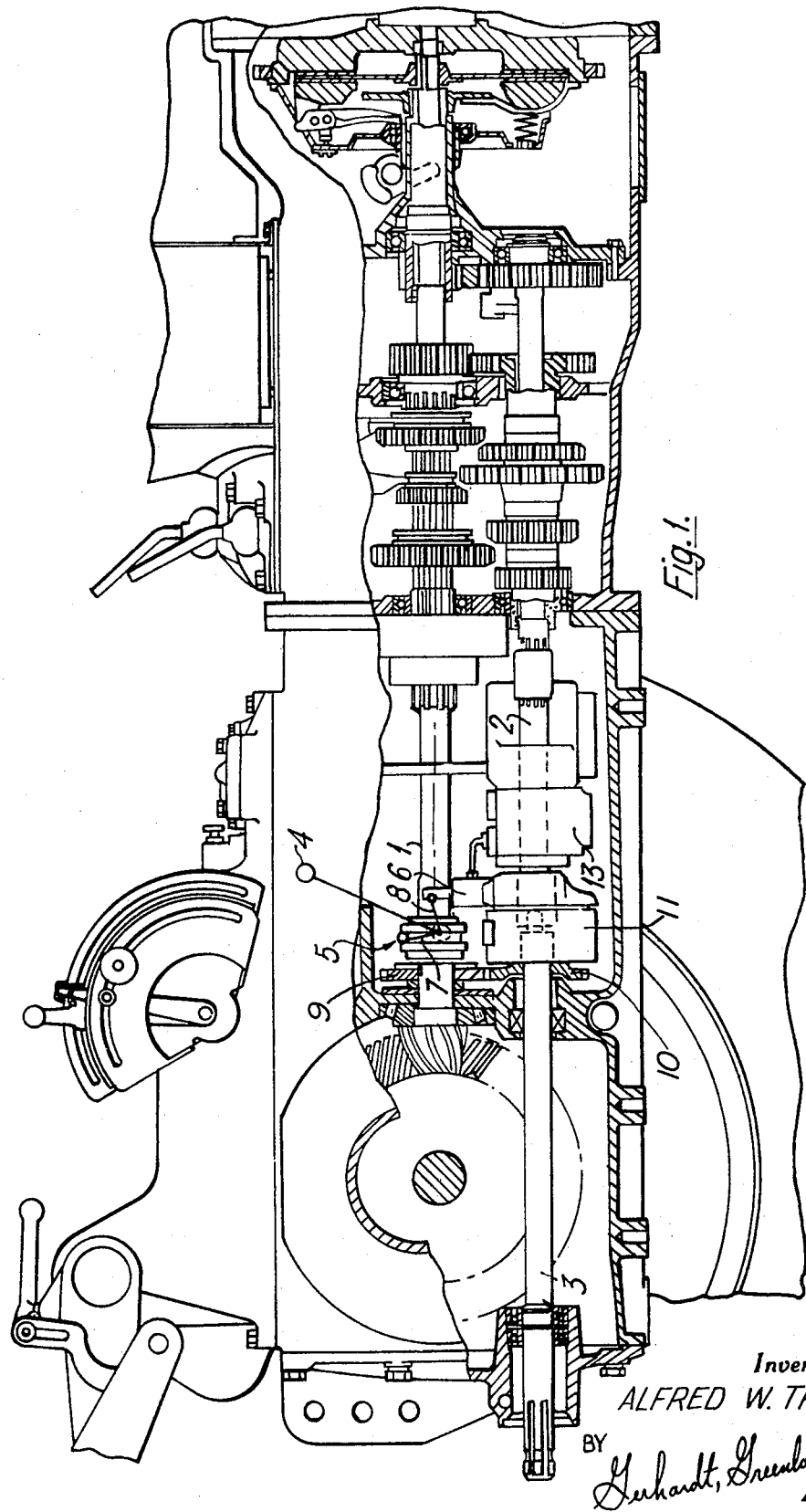

United States Patent
Thomas

[15] 3,674,106
[45] July 4, 1972

[54] CONTROL FOR POWER TAKE-OFF

[72] Inventor: Alfred W. Thomas, Earl Shilton, England

[73] Assignee: Massey-Ferguson Services N.V., Curacao, Netherlands Antilles

[22] Filed: Feb. 6, 1970

[21] Appl. No.: 9,297

[30] Foreign Application Priority Data

Feb. 13, 1969 Great Britain .......................7,760/69

[52] U.S. Cl. ..............................................180/53, 192/4 A
[51] Int. Cl. .......................................................B60k 17/28
[58] Field of Search .....................................192/4 A; 180/53

[56] References Cited

UNITED STATES PATENTS

| | | | |
|---|---|---|---|
| 2,817,408 | 12/1957 | Klemm | 180/53 |
| 2,945,382 | 7/1960 | Ritter et al. | 180/53 X |
| 3,104,528 | 9/1963 | Horig | 180/53 X |
| 3,209,872 | 10/1965 | Moyer et al. | 192/4 A X |

*Primary Examiner*—A. Harry Levy
*Attorney*—Gerhardt, Greenlee & Farris

[57] ABSTRACT

A vehicle has a P.T.O. transmission comprising a main drive shaft rotatable at a speed proportional to the ground speed of the vehicle, an auxiliary shaft rotatable at a speed proportional to the speed of the engine, and a P.T.O. shaft selectively connectible to each of said shafts through first and second clutches, respectively. Clutch operating means have a first-clutch operating position, a second-clutch operating position and a neutral position for selectively providing two P.T.O. speeds or neutral. A brake on said P.T.O. shaft is operable by the clutch operating means when the latter is the neutral position to immobilize the P.T.O. shaft and enable connection of implement drive shafts.

5 Claims, 2 Drawing Figures

Inventor
ALFRED W. THOMAS
BY
Gerhardt, Greenlee & Farris
Attorneys

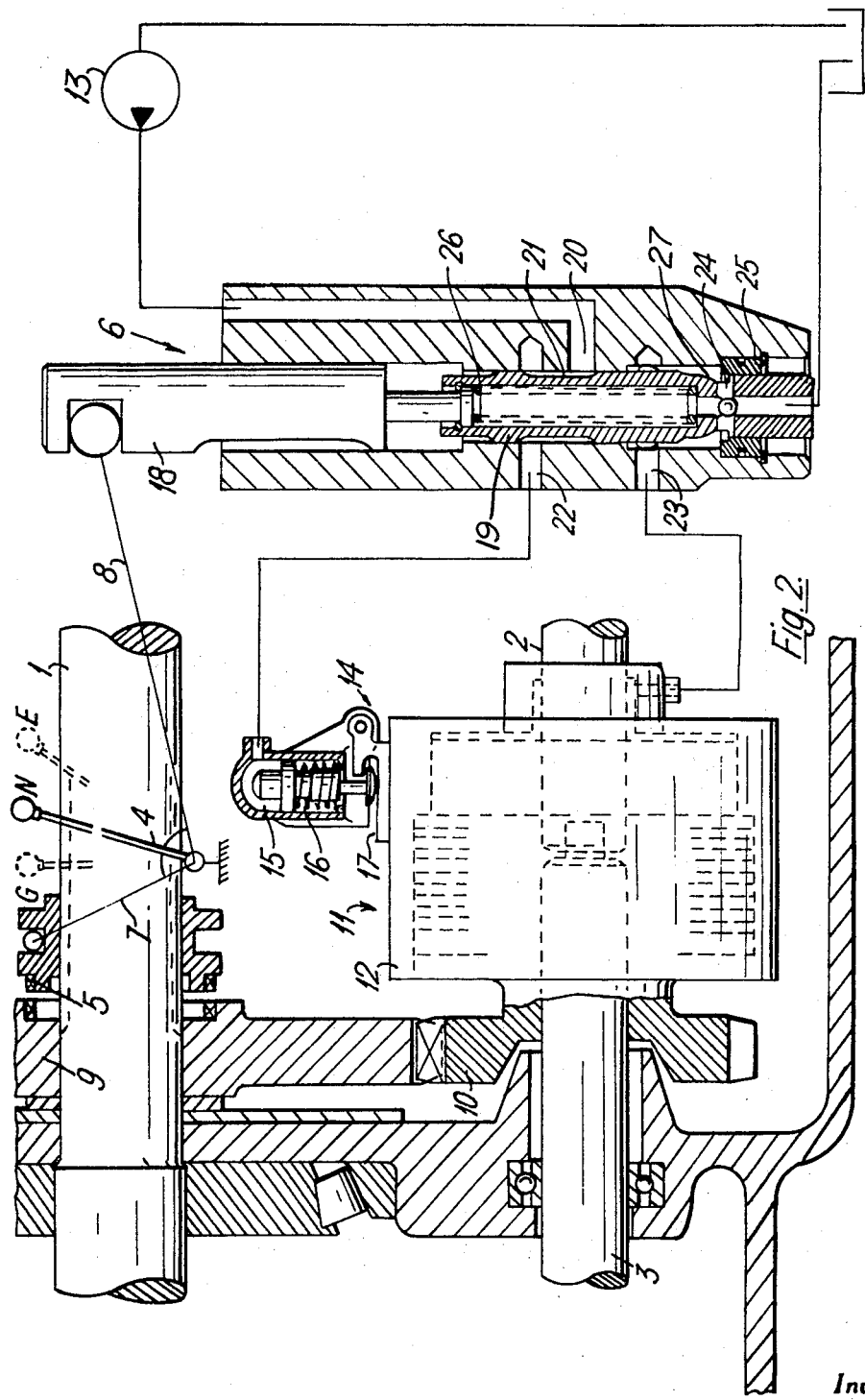

CONTROL FOR POWER TAKE-OFF

This invention relates to a power take-off transmission (hereinafter referred to as a P.T.O. transmission) for a vehicle, especially but not exclusively, a tractor.

It has been found that multi-plate clutches may have a considerable drag in their disengaged condition so that drive, of relatively small torque magnitude, may occur. Such an occurrence is of significance in P.T.O. transmissions. It is known to apply a brake to the P.T.O. shaft when the clutch is disengaged. However, in known arrangements the brake continues to be applied when the P.T.O. shaft is driven at a speed known in the art as proportional to the ground speed of the vehicle thereby constituting a disadvantageous source of wear on the brake. Wherever speed proportional to ground speed is used hereafter it is assumed that there is zero wheel slip.

An object of the present invention is to provide a vehicle having a P.T.O. transmission comprising a main drive shaft rotatable at a speed proportional to the ground speed of the vehicle, an auxiliary shaft rotatable at a speed proportional to the speed of the engine, a P.T.O. shaft selectively connectible to each of said shafts through first and second clutches, respectively, clutch operating means having a first-clutch operating position, a second-clutch operating position and a neutral position, and a brake on said P.T.O. shaft and operable by the clutch operating means when the latter is in the neutral position.

An embodiment of the invention will now be described, by way of example, with reference to the accompanying drawings of which:

FIG. 1 is a longitudinal sectional view of a tractor equipped with a P.T.O. transmission embodying the features of the present invention; and FIG. 2 is a diagrammatic view showing a detail of the transmission shown in FIG. 1.

Referring to the drawing, a tractor includes a P.T.O. transmission having a main drive shaft 1 which transmits drive from the engine (not shown) to the rear axle of the tractor and is rotatable at a speed proportional to the ground speed of the tractor. An auxiliary shaft 2 is provided which is connected to the engine through constant mesh gearing so that it is rotatable at a speed proportional to the engine speed. A P.T.O. shaft 3 is also provided and extends to an outlet at the rear or side of the tractor, as desired. A manual selector 4 controls the operation of a first, mechanically operable dog clutch 5 and the setting of a valve 6 through the medium of levers 7 and 8, respectively. A freely rotatable gear 9 is mounted on the shaft 1 and the dog clutch 5 is arranged to drivingly connect the gear 9 to shaft 1 when desired. The gear 9 is in constant mesh with a gear 10 which is drivingly connected to the shaft 3. A second, hydraulically operable multi-plate clutch 11 has a normally driven member 12 drivingly connected to the gear 10 and a normally driving member drivingly connected to the shaft 2. The clutch 11 is hydraulically engageable so as to transmit drive from the auxiliary shaft 2 to the P.T.O. shaft 3.

The valve 6 is supplied by pressurized fluid from a source 13, which is normally a pump on the tractor, and acts to direct the fluid to and from the multi-plate clutch 11 and to and from a brake 14 which is operative to slow down and stop the P.T.O. shaft by frictional engagement with the outer surface of the driven member 12.

The dog clutch 5 and the valve 6 are positioned in one of three positions by the selector 4. The positions are G, for ground speed, N for neutral, and E for engine speed.

When the selector 4 is placed in the N position the dog clutch 5 is disengaged and the valve 6 directs fluid to a piston and cylinder 15 which overcomes the bias of a spring 16 so as to press a brake shoe 17 on to the outer cylindrical surface of the driven member 12. In the N position a plunger 18 holds a spool 19 in the valve 6 at a level where fluid flows from an inlet port 20 through a gallery 21 to a brake service port 22 and thereafter to the brake cylinder 15. At the same time a clutch service port 23 is connected to a sump by a passage 24 exposed by a collar 25 retained in the lower end of the valve housing and encircling the valve spool 19. Thus, in the N position the brake is positively applied and both the clutches 5 and 12 are disengaged.

When the selector 4 is placed in the G position the dog clutch 5 is engaged and the gearwheel 9 rotates with the shaft 1. Movement of the selector to the G position of the valve 6 results in the plunger 18 and the spool 19 being lifted so that the inlet port 20 is blocked and the piston and cylinder 15 is vented through the gallery 21 to a chamber above the spool 19 and then through the hollow center of the spool 19 to the sump. The clutch service port 23 remains connected to the sump through the passage 24. Thus, in the G position only the clutch 5 is engaged and both the brake 14 and clutch 12 are deactivated so that the P.T.O. shaft 3 rotates at a speed proportional to the ground speed of the tractor.

When the selector 4 is placed in the E position the clutch 5 is disengaged and the gearwheel 9 rotates freely on the shaft 1. The valve plunger 18 is depressed and initially moves the spool downwardly by means of a helical spring 26 positioned between the plunger and spool in the hollow center of the latter. Such downward movement causes the gallery 21 to bridge the inlet port 20 and the clutch service port 23 thus allowing pressure to engage the clutch 12. The portion of the spool 19 that passes through the collar 25 is of smaller diameter than the rest of the spool and hence there is an upward resultant force arising from the pressure, which force causes the spool 19 to lift against the spring 26. This lift continues until fluid begins to spill out of the passage 24 through a tapered neck 27 adjacent thereto. The spillage adjusts the pressure to a suitable level for the clutch 12. Simultaneously, the brake service port 22 is connected to the chamber above the spool 19 and from there through the hollow center of the spool to the sump. Thus, in the E position the clutch 12 is engaged, thus rotating the P.T.O. shaft 3 at a speed proportional to the engine speed, the brake being released and the clutch 5 being disengaged.

Engagement of the clutch 12 takes place smoothly and gently due to the gradual build-up of pressure permitted by the spring loaded spool 19. This prevents undue drive shocks to apparatus connected to the P.T.O. shaft 3.

While the invention has been described with reference to a tractor, it will be clear that the invention is equally applicable to any vehicle having a P.T.O.

I claim:

1. A vehicle having a P.T.O. transmission comprising a main drive shaft rotatable at a speed proportional to the wheel speed of the vehicle, an auxiliary shaft rotatable at a speed proportional to the speed of the engine, a P.T.O. shaft, first and second clutches selectively connecting the respective main drive and auxiliary shafts to the P.T.O. shaft, clutch operating means having a first-clutch operating position, a second-clutch operating position and a neutral position, and a brake operable by the clutch operating means when in the neutral position to brake the P.T.O. shaft and in which said clutch operating means include mechanical means for operating said first clutch and hydraulic means for operating said second clutch and said brake.

2. A vehicle as claimed in claim 1, in which said clutch operating means include a valve for selectively connecting a source of pressurized fluid to the hydraulically operable clutch and brake.

3. A vehicle as claimed in claim 2, in which said clutch operating means include a manually operable selector which is mechanically connected to said first clutch and said valve.

4. A vehicle as claimed in claim 3, in which said first clutch is a dog clutch.

5. A vehicle as claimed in claim 3, in which said valve is a spool valve.

* * * * *